Jan. 1, 1929.
F. W. PETERS
1,697,473
UNIVERSAL JOINT
Filed March 23, 1925      2 Sheets-Sheet 1
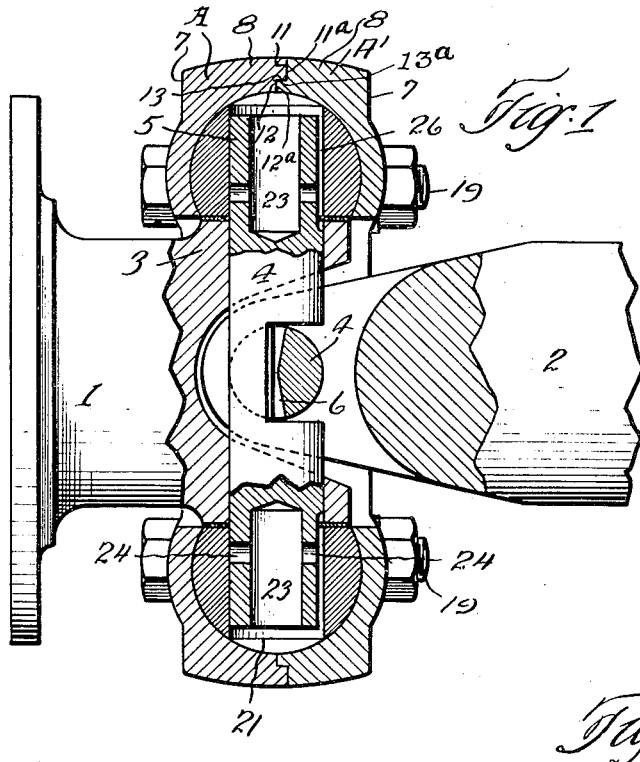
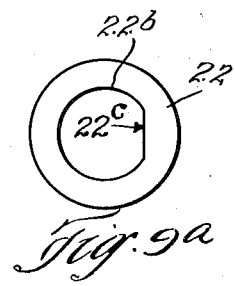
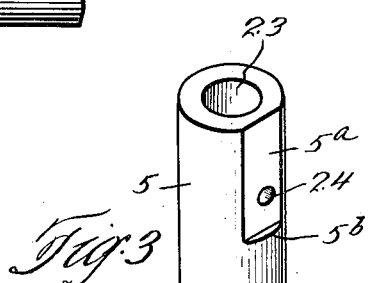
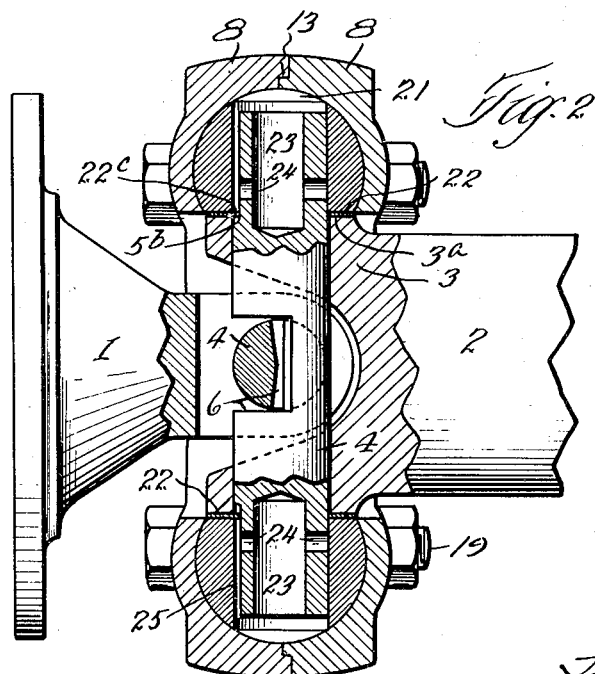
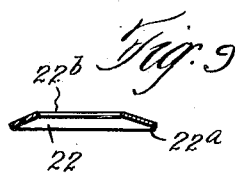
Inventor
Frederick W. Peters
By Hull, Buck West
Attys.

Jan. 1, 1929.　　　　　　　　　　　　　　　　　　1,697,473
F. W. PETERS
UNIVERSAL JOINT
Filed March 23, 1925　　　　　　2 Sheets-Sheet 2
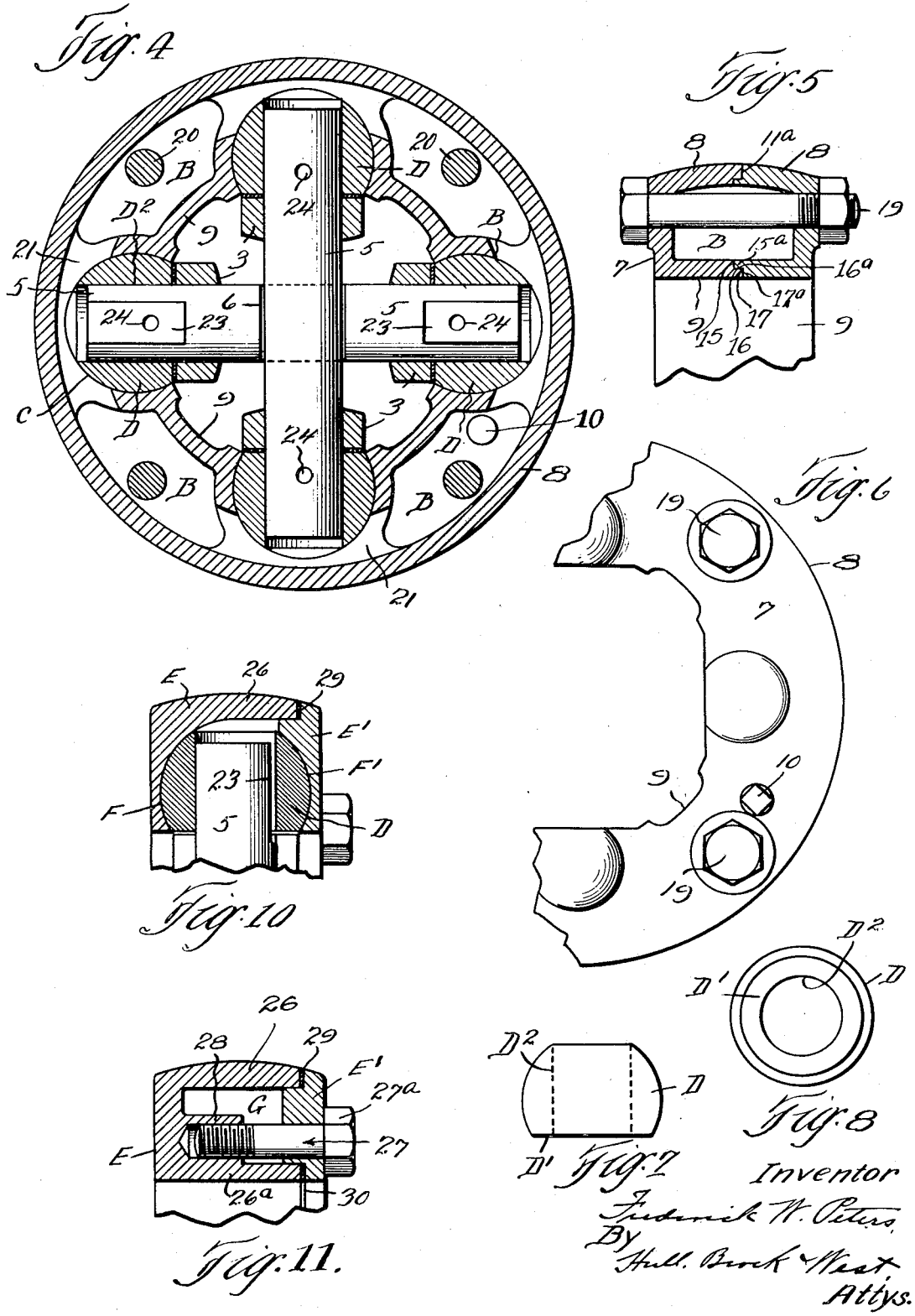

Patented Jan. 1, 1929.

1,697,473

UNITED STATES PATENT OFFICE.

FREDERICK W. PETERS, OF CLEVELAND, OHIO, ASSIGNOR TO SPICER MANUFACTURING CORPORATION, OF SOUTH PLAINFIELD, NEW JERSEY, A CORPORATION OF VIRGINIA.

UNIVERSAL JOINT.

Application filed March 23, 1925. Serial No. 17,715.

This invention relates to universal joints, and more particularly to joints of the character wherein the trunnions are mounted in and connected by a member in the shape of a ring having a chamber or chambers for lubricant therein. It is the general purpose and object of the invention to provide a construction of universal joint of this character wherein the trunnions may be efficiently lubricated; also to provide a joint which is cheap to manufacture, and which is easily assembled and disembled.

Further and more limited objects of the invention will appear hereinafter and will be realized in and through the construction and arrangement of parts shown in the drawings, wherein Fig. 1 represents a sectional elevation of a universal joint embodying the invention; Fig. 2 a similar view, taken at right angles to Fig. 1; Fig. 3 a detail in perspective of one of the cross pins; Fig. 4 a central sectional view through the ring, showing the pins and trunnions in elevation; Fig. 5 a transverse sectional view through the connecting ring; Fig. 6 a detail in elevation of said connecting ring; Figs. 7 and 8 details in elevation and bottom plan, respectively, of one of the bearing blocks; Fig. 9 a detail in section and Fig. 9ª a detail in plan of the spring washer which surrounds each trunnion; Fig. 10 a detail in section through a ring, bearing block and trunnion of a modified form of my invention; and Fig. 11 a detail, similar to Fig. 5, of such modification.

Describing the various parts by reference characters, 1 and 2 denote hubs, connected respectively with the driving and the driven shaft sections (not shown). The hubs are provided each with a yoke 3 each having mounted therein a cross pin 4, the outer ends of each cross pin projecting beyond their respective yokes and constituting trunnions 5. Each cross pin is provided with a central recess 6 of slightly greater depth than the radius of such pin, each recess being about 210 degrees in angular extent. The trunnions are adapted to be mounted in bearing blocks carried by and mounted within a connecting member in the form of a ring. The ring is preferably made of two sections, indicated at A and A', each of the sections having an annular side wall 7 and an outer convex wall 8, each ring section also having a segmental inner wall 9. The ring sections are arranged to provide, when assembled, chambers B for lubricant, one of the chambers being provided with a filling opening for lubricant, the opening being closed by a removable plug 10. The ring section A is provided with an outer annular seating surface 11 and an inner annular seating surface 12 offset laterally from the former seating surface, while the ring section A' is provided with cooperating seating surfaces 11ª and 12ª, there being short cylindrical seating surfaces 13 and 13ª carried by the members A and A' respectively between the said annular seating surfaces. This construction forms a stepped joint between the two ring sections, which joint may be provided with gaskets if desired. The segmental inner walls of these sections are provided with stepped seats, indicated at 15, 15ª, 16, 16ª, 17 and 17ª (see Fig. 5). Gaskets may be interposed between the seats 15, 15ª and 16, 16ª.

Each ring section has a segmental lubricant chamber adapted, when the sections are connected by the bolts 19 extending through the openings 20 in the opposed side walls of the ring sections, to provide complete lubricant chambers B. Each ring section is also provided with sectional seating recesses intermediate the chamber recesses B. Each sectional seating recess in each ring section, indicated at C, is nearly hemispherical in shape, the ring sections, when united, providing seats each of the shape of a hollow segment of a sphere which is greater than a hemisphere, with the base of the spherical segment presented toward the center of the joint, so that a radius drawn from the center of the spherical segment toward the center of the joint will be at right angles to the base of said segment.

It will be noted that, when the ring sections are assembled, the chambers B are spaced from each other by means of the side walls of the seats C as well as by the bearing blocks (to be described) which are inserted within such seats. Each chamber B is adapted to communicate with the interior of the adjacent seats C by means of openings 21 in the outer portions of the walls of said seats, the said openings providing for the supply of lubricant to the interior of the chambers C as well as for the circulation of lubricant by centrifugal action around the outer portions of the seats C and the outer ends of the bearing blocks and trunnions.

Cooperating with each of the seats C is a bearing block, indicated generally at D, each of the blocks being originally in the shape of a segment of a sphere greater than a hemisphere and adapted to fit within a seat C. Each block D has a circular base D' which is presented inwardly, or toward the center of the joint, the base D' being preferably in the same plane as the inner end or base of its seat C. Each block D is provided with a cylindrical bore $D^2$ which extends from the base D' entirely through the outer surface of the block, each bore $D^2$ preferably projecting beyond the outer end of a cooperating trunnion 5 and providing a short cylindrical chamber extending beyond the end of such trunnion.

Surrounding each trunnion 5 is a washer 22 of spring metal, each such washer normally having its outer edge $22^a$ in a different plane from its inner edge $22^b$. It will be noted—see Figs. 2-5 inclusive—that each trunnion is in the shape of a segment of a cylinder, each trunnion having a flattened face $5^a$ extending parallel with the axis thereof, there being a shoulder $5^b$ at the base of such flattened face. The inner edge $22^b$ of each washer is of such shape as to fit upon a trunnion, the inner edge of each washer being in the shape of a segment of a circle but with a flattened or straight portion at $22^c$ cooperating with the surface $5^a$ of its trunnion and adapted to rest upon seat $5^b$. The parts are so proportioned that, when the bearing blocks are applied to the trunnions, the washers 22 will be flattened out between the bases of the blocks and the shoulders $3^a$ provided at the outer ends of the yokes.

Each trunnion is provided with a central chamber 23 extending inwardly from the outer end thereof from which chamber ports 24 extend through the walls of the trunnions at right angles to the plane of rotation of the joint, thus enabling the lubricant to be discharged freely, through such ports, between the trunnions and their bearing blocks, as no driving thrust is exerted upon the sides of the joints thereby to interfere with such distribution. By the construction of the lubricating parts, the bearing blocks will be effectively lubricated by the ports or openings 21, and the space between the trunnions and their seats will be likewise effectively lubricated by the passages 21, the chambers 23, and the ports 24, one of such ports communicating at its outer end with the groove or port 25 provided between the flattened face $5^a$ of each trunnion and the cylindrical inner surface of the surrounding bearing block.

With the parts constructed and arranged as described, the bearing blocks will be applied to their trunnions, with the washers 22 in place, and the ring sections A and A' will be clamped together about such bearing blocks by means of the bolts 19. With the parts properly proportioned, this will result in forcing the blocks D inwardly, compressing the spring washers and securing leak-proof joints between the bearing blocks and the shoulders $3^a$. The angular extent of the recesses 6 will accommodate the relative movements of the hubs and pins during the rotation of the joint.

As the joint rotates, the lubricant is forced outwardly in each chamber B by centrifugal action as well as in the direction of the rotation of the joint, with the result that there is a pressure exerted by the lubricant on one side of the outer portion of each block D with a partial vacuum on the outer portion of the opposite side of each such block. Because of this action and the arrangement of the chambers 23, grooves 25, and ports 24, lubricant will always be interposed between each trunnion 5 and the surrounding portion of its bearing block, provided only that some lubricant is present in the chambers B. Furthermore, by having the faces $5^a$ intersect each a port 24, a corresponding saving in the bearing surface of each trunnion is obtained.

In Figs. 10 and 11 there is shown a modification of my invention wherein the ring is composed of two sections E and E' one of such sections (the section E) having an outer wall 26 and an inner wall $26^a$ of nearly the full width of the ring, while the wall E' constitutes practically a side wall which closes the sides of the bearing-block chambers F and the lubricant chambers G. In this case, the ring section E' has a small spherical segmental seat F' while the ring section E has a large segmental spherical seat F, both being sections providing, when assembled, complete segmental seats for the blocks.

In this form of my invention, instead of connecting the ring sections by bolts extending entirely through the same, I prefer to use bolts 27 each having a head $27^a$ adapted to bear against the outer face of the ring section E' and each having its other end threaded into a boss 28 projecting into each chamber G from the section F. Gaskets 29 and 30 are interposed between the inner and outer abutting surfaces of the ring sections E and E'.

Due to the shape of the bearing blocks and their cooperating seats, the opposed blocks are self-adjusting, during the assembling operation, to align their bores, after which the bolts 19 may be set up to final clamping position.

Having thus described my invention, what I claim is:—

1. In a universal joint of the trunnion type, in combination, a pair of coupling members, a plural part transmission ring, and bearing members formed spherically for the trunnions clamped between the ring members and capable of independent universal alignment when assembling.

2. In a universal joint, in combination, a pair of coupling members each terminating in a pair of opposed substantially coaxial trunnions, a bearing member for each trunnion, each bearing member having a cylindrical bore adapted to receive and provide bearing surface for its trunnion, a transmission ring, means providing support for the bearing members on the transmission ring in quarteringly spaced relation and further providing for independent universal positioning of each bearing member upon and with respect to the transmission ring when assembling to position its bearing surface parallel with its complemental trunnion bearing surface, and means for securing and holding the bearing members so positioned fixed with relation to the transmission ring.

3. In a universal joint, in combination with a pair of coupling members each terminating in a pair of opposed coaxial trunnions, of a ring type transmission means comprising a pair of ring members each shaped to provide on one side quarteringly disposed semi-spherical sockets, said ring members being juxtaposed so that said sockets are in registration and provide recesses for the reception of bearing members, a bearing member positioned in each recess, each bearing member being centrally bored to provide a cylindrical bearing for a trunnion and having a spherical exterior surface adapted to seat on the complemental surfaces of the spherical sockets and to assume a position of alignment with respect to its trunnion with its cylindrical surface providing full bearing contact therewith, and means for clamping said ring members together and upon said bearing members to rigidly secure and hold them in their respective positions of alignment.

4. In a universal joint, the combination of a pair of coupling members, a sectional transmission member, trunnion connections between said members, and a separate spherical-shaped bearing member for each trunnion which is self-aligning in all directions with respect to the trunnion and the sectional transmission member and is arranged to be clamped between the sections of the latter in its self-assumed position of alignment.

In testimony whereof, I hereunto affix my signature.

FREDERICK W. PETERS.